(12) United States Patent
Friedman et al.

(10) Patent No.: US 10,381,005 B2
(45) Date of Patent: Aug. 13, 2019

(54) SYSTEMS AND METHODS FOR DETERMINING USER FRUSTRATION WHEN USING VOICE CONTROL

(71) Applicant: Toyota Motor Engineering & Manufacturing North America, Inc., Erlanger, KY (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/824,627

(22) Filed: Nov. 28, 2017

(65) Prior Publication Data
US 2019/0164544 A1  May 30, 2019

(51) Int. Cl.
*G10L 15/00* (2013.01)
*G10L 15/22* (2006.01)
*G10L 15/18* (2013.01)
*H04L 29/08* (2006.01)
*G10L 15/30* (2013.01)
(Continued)

(52) U.S. Cl.
CPC .............. *G10L 15/22* (2013.01); *G10L 15/08* (2013.01); *G10L 15/1807* (2013.01); *G10L 15/30* (2013.01); *G10L 25/63* (2013.01); *H04L 67/12* (2013.01)

(58) Field of Classification Search
CPC .............. G10L 15/22; G06F 3/01; G06F 3/16
USPC ......................................................... 704/275
See application file for complete search history.

(56) References Cited

U.S. PATENT DOCUMENTS

| | | |
|---|---|---|
| 6,330,499 B1 | 12/2001 | Chou et al. |
| 8,054,990 B2 | 11/2011 | Gratke et al. |
| 8,515,616 B2 | 8/2013 | Ering et al. |

(Continued)

FOREIGN PATENT DOCUMENTS

CN            106803423 A     6/2017

*Primary Examiner* — Daniel Abebe
(74) *Attorney, Agent, or Firm* — Dinsmore & Shohl, LLP

(57) ABSTRACT

Systems, methods, and vehicle components for determining user frustration are disclosed. A method includes receiving, by a microphone communicatively coupled to a processing device, a voice input from a user, the voice input corresponding to an interaction between the user and a voice recognition system and including indicators of the user frustration. The method further includes determining, by the processing device, that the user is frustrated from the indicators, connecting, by the processing device, the user to a call center operator, transmitting, by the processing device, data to a call center computing device associated with the call center operator, the data corresponding to a user input and/or a vehicle response that resulted in the user frustration, receiving, by the processing device, commands from the call center computing device, and executing, by the processing device, processes that correspond to the commands.

20 Claims, 5 Drawing Sheets

(51) Int. Cl.
*G10L 25/63* (2013.01)
*G10L 15/08* (2006.01)

(56) References Cited

U.S. PATENT DOCUMENTS

| | | |
|---|---|---|
| 8,560,166 B2 | 10/2013 | Mori et al. |
| 9,124,697 B2 * | 9/2015 | Scott ................. H04M 3/42221 |
| 2011/0161082 A1 * | 6/2011 | Braho ..................... G10L 15/01 |
| | | 704/251 |
| 2014/0136187 A1 | 5/2014 | Wolverton et al. |
| 2014/0221781 A1 | 8/2014 | Schrauf et al. |
| 2015/0345981 A1 * | 12/2015 | Goldman-Shenhar ....................... |
| | | G01C 21/3629 |
| | | 701/533 |
| 2017/0084295 A1 * | 3/2017 | Tsiartas ................... G10L 25/63 |
| 2017/0160813 A1 * | 6/2017 | Divakaran .............. G06F 3/017 |

* cited by examiner

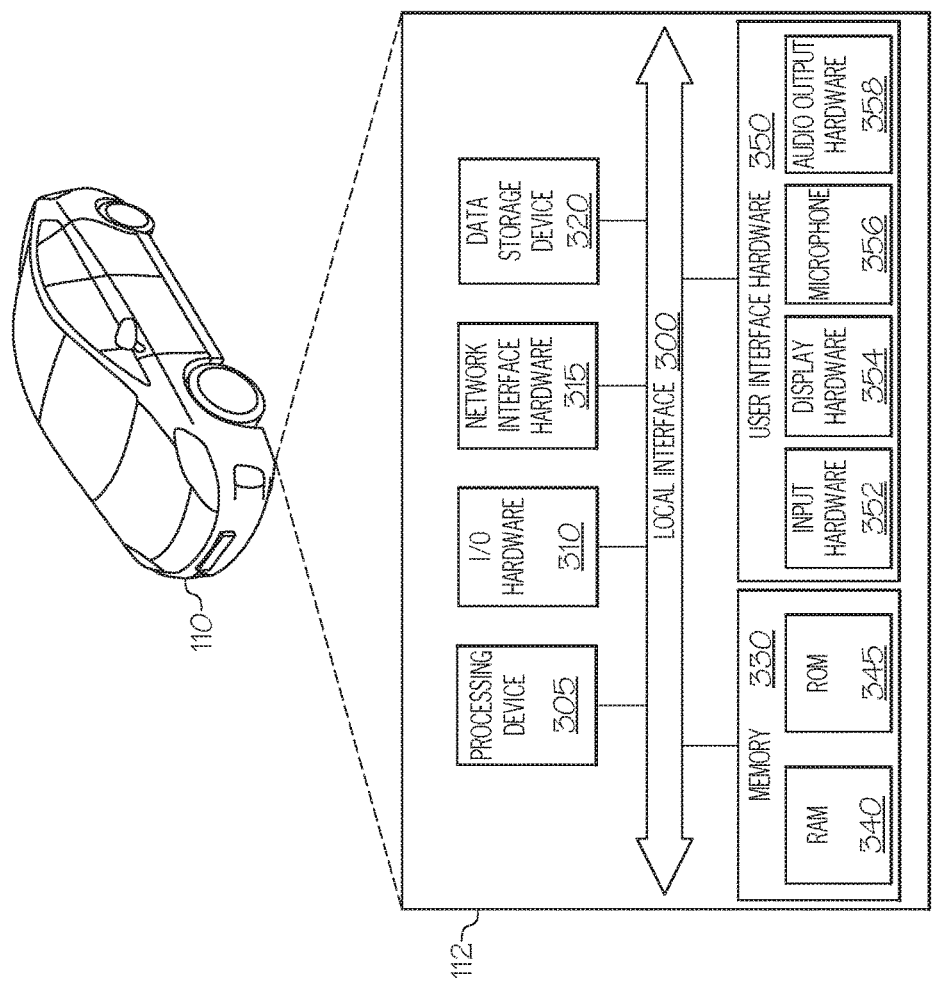

10,381,005 B2

SYSTEMS AND METHODS FOR DETERMINING USER FRUSTRATION WHEN USING VOICE CONTROL

BACKGROUND

Field

The present specification generally relates to monitoring voiced inputs between a user and an automated speech recognition module and, more particularly, to systems and methods for determining whether a voiced input from a user indicates that the user is frustrated.

Technical Background

Currently, some user interfaces that interact with a user via voiced inputs, such as certain vehicle user interfaces, rely on automated speech recognition (ASR) modules for recognizing a voiced input and generating electronic signals that correspond to the voiced input. Such ASR modules may have difficulty generating the appropriate electronic signals because of an inability to properly understand the voiced input. As a result, the user may become frustrated with his/her inability to effectively supply a voiced command. Such frustration may cause the user to cease using the voice commands and/or use physical controls, which, when the user interface is located in a vehicle, may cause the user to become distracted while driving.

Accordingly, there exists a need for systems and methods that monitor voiced inputs, determine whether a user is frustrated from the voiced inputs, and complete one or more actions in response if the user is determined to be frustrated.

SUMMARY

In one embodiment, a method for determining user frustration includes receiving, by a microphone communicatively coupled to a processing device, a voice input from a user. The voice input corresponds to an interaction between the user and a voice recognition system, and includes one or more indicators of the user frustration. The method further includes determining, by the processing device, that the user is frustrated from the one or more indicators, connecting, by the processing device, the user to a call center operator, and transmitting, by the processing device, data to a call center computing device associated with the call center operator. The data corresponds to one or more of a user input and a vehicle response that resulted in the user frustration. The method further includes receiving, by the processing device, one or more commands from the call center computing device and executing, by the processing device, one or more processes that correspond to the one or more commands.

In another embodiment, a system for determining user frustration includes a microphone, a processing device communicatively coupled to the microphone, and a non-transitory, processor-readable storage medium. The non-transitory, processor-readable storage medium includes one or more programming instructions thereon that, when executed, cause the processing device to receive, from the microphone, data pertaining to a voice input from a user. The voice input corresponds to an interaction between the user and a voice recognition system and includes one or more indicators of the user frustration. The non-transitory, processor-readable storage medium further includes one or more programming instructions thereon that, when executed, cause the processing device to determine that the user is frustrated from the one or more indicators, connect the user to a call center operator, transmit data to a call center computing device associated with the call center operator, the data corresponding to one or more of a user input and a vehicle response that resulted in the user frustration, receive one or more commands from the call center computing device, and execute one or more processes that correspond to the one or more commands.

In yet another embodiment, a vehicle component for determining user frustration includes a microphone configured to receive a voice input from a user and a processing device communicatively coupled to the microphone. The voice input corresponds to an interaction between the user and a voice recognition system and includes one or more indicators of the user frustration. The processing device is configured to determine that the user is frustrated from the one or more indicators, connect the user to a call center operator, transmit data to a call center computing device associated with the call center operator, wherein the data corresponds to one or more of a user input and a vehicle response that resulted in the user frustration, receive one or more commands from the call center computing device, and execute one or more processes that correspond to the one or more commands.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 3A schematically depicts illustrative hardware components of a vehicle component that may be used in determining user frustration from voiced inputs according to one or more embodiments shown and described herein;

DETAILED DESCRIPTION

The present disclosure relates generally to systems and methods in a vehicle that monitor a voiced input supplied, via a user interface, to an ASR module or the like, parse the input to discover indicators of user frustration, determine whether a user that provided the voiced input is frustrated based on the indicators, and if the user is determined to be frustrated, connect the user to a call center. In addition, the systems and methods described herein may interface with a server and/or a call center computing device to receive commands for executing one or more processes, receive software programming updates, and/or the like. For example, if a user is providing voice inputs to a vehicle system, the systems and methods described herein may monitor the voice input, determine from one or more indicators in the voice input that the user is frustrated, and either prompt the user to connect to a call center or directly connect the user without prompting. The call center operator can then assist the user in executing one or more vehicle commands by directly transmitting control signals to the vehicle system to ease the user's frustration and/or by updating programming code such that the vehicle system does not frustrate the user in the future.

Figure 1:
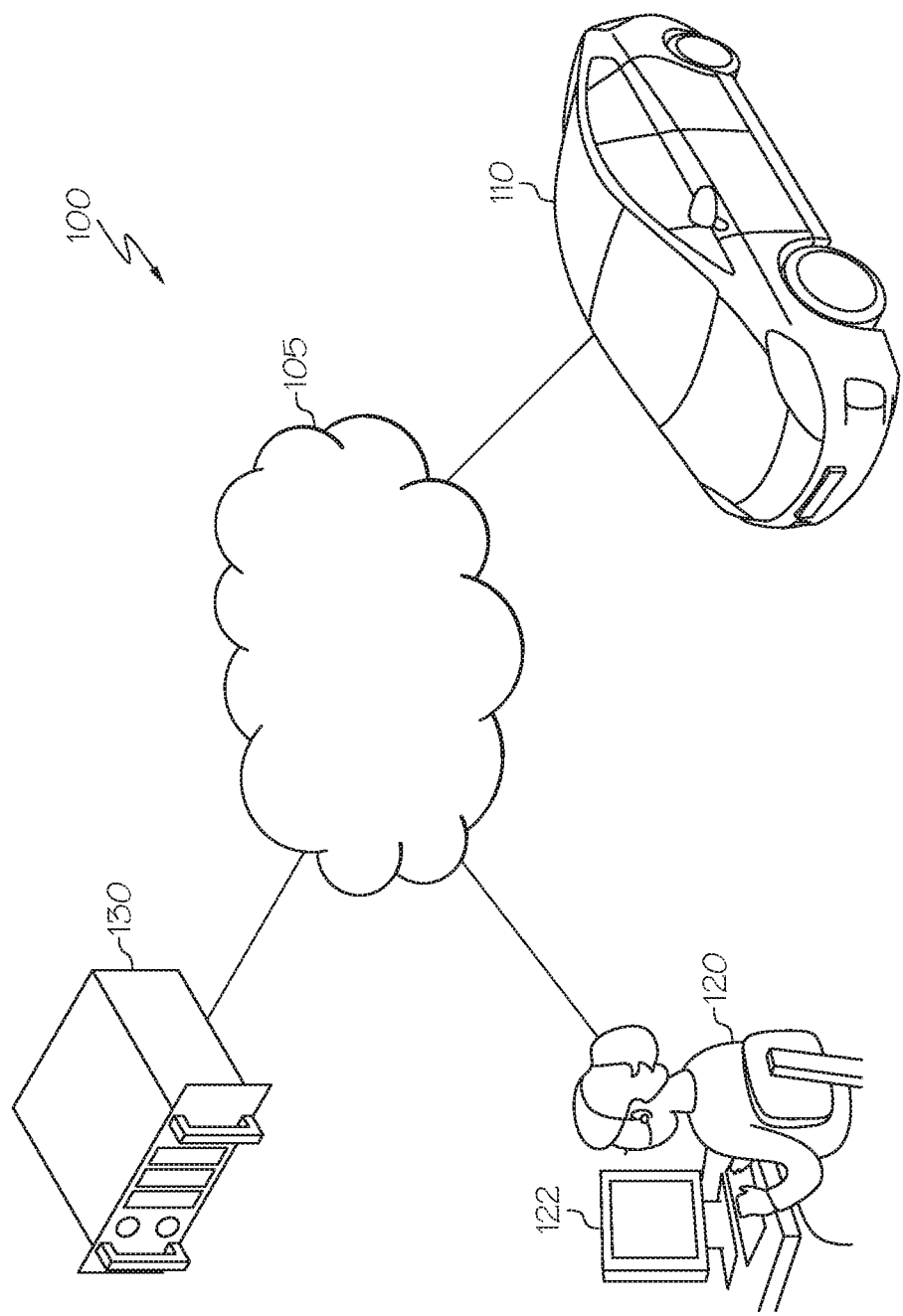
FIG. 1 schematically depicts an illustrative network having components for a system for determining user frustration from voiced inputs according to one or more embodiments shown and described herein.

Referring now to the drawings, FIG. 1 depicts an illustrative network 100 having components for a system for determining user frustration from voiced inputs according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices, systems, and/or components thereof. Illustrative devices may include, but are not limited to, a vehicle 110, a call center 120 having a call center computing device 122, and a server computing device 130.

The vehicle 110 may generally be any vehicle with one or more onboard computing devices, particularly computing devices that contain hardware for receiving voice inputs from a user (such as a driver of the vehicle 110) and providing audible outputs to the user. Thus, the vehicle 110 and/or components thereof may perform one or more user-facing functions, such as receiving one or more inputs from the user (including voice inputs) or providing information to the user, as described in greater detail herein.

The call center computing device 122 may generally be used as an interface between a call center operator and the other components connected to the computer network 105. Thus, the call center computing device 122 may be used to perform one or more call center operator-facing functions, such as receiving one or more inputs from the call center operator or providing information to the call center operator, as described in greater detail herein. Accordingly, the call center computing device 122 may include at least a display and/or input hardware. In the event that the server computing device 130 and/or the vehicle 110 (or components thereof) requires oversight, updating, and/or correction, the call center computing device 122 may be configured to provide the desired oversight, updating, and/or correction. The call center computing device 122 may also be used to input additional data into a corpus of data stored on the server computing device 130 and/or the vehicle 110. For example, the call center computing device 122 may contain software programming or the like that provides the user with options and/or prompts to provide inputs relating to pronunciations of words that are associated with particular commands, particular keywords that are associated with particular commands, particular voice patterns that are associated with particular commands, particular user profiles that are associated with particular commands, and/or the like.

The server computing device 130 may receive data from one or more sources, generate data, store data, index data, search data, and/or provide data to the call center computing device 122 and/or the vehicle 110 (or components thereof).

It should be understood that while the call center computing device 122 is depicted as a personal computer and the server computing device 130 is depicted as a server, these are nonlimiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the call center computing device 122 and the server computing device 130 may represent a plurality of computers, servers, databases, components, and/or the like.

Figure 2:
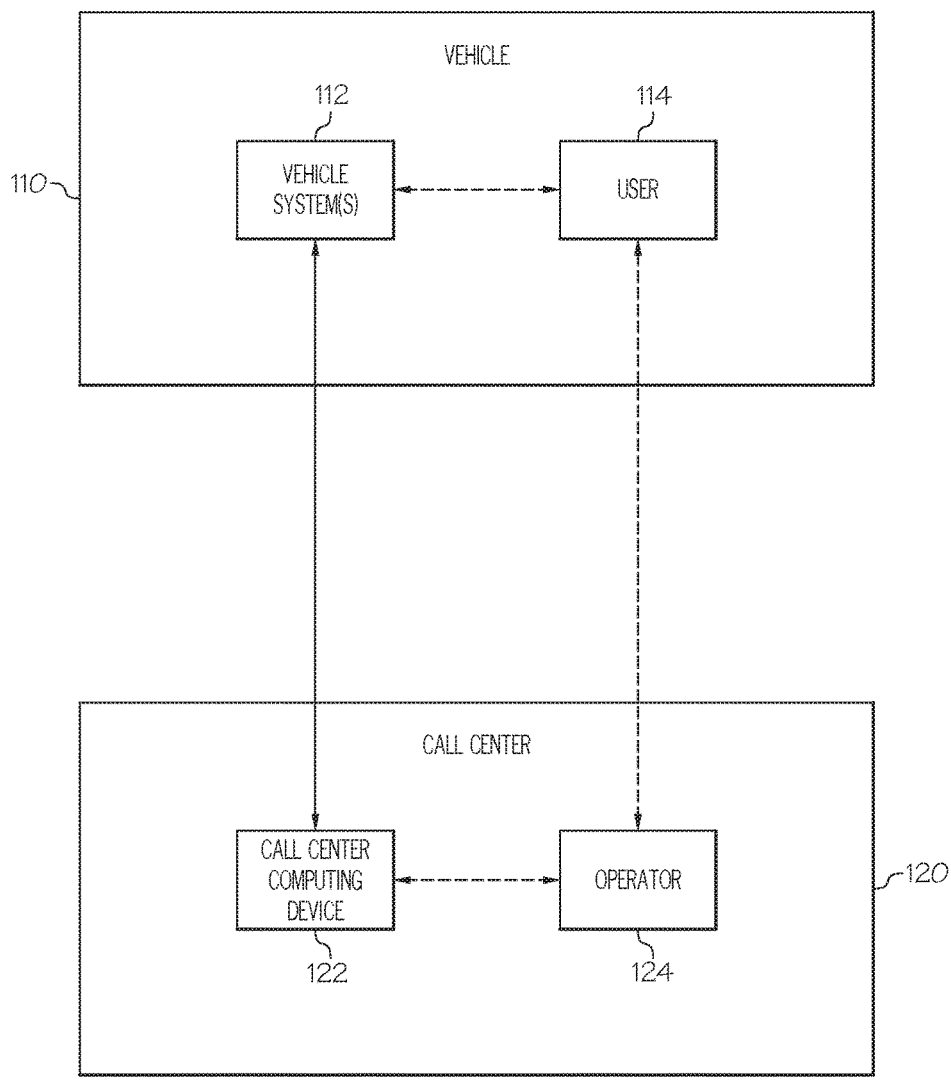
FIG. 2 schematically depicts a block diagram of the interconnectivity between a vehicle and a call center according to one or more embodiments shown and described herein.

FIG. 2 schematically depicts a block diagram of the specific interconnectivity between the vehicle 110 and the call center 120 according to one or more embodiments. As shown in FIG. 2, the vehicle 110 may include one or more vehicle systems 112 therein. The vehicle systems 112 are not limited by this disclosure, and may each be any system located within the vehicle 110 (FIG. 1) that can be operable by a user 114 to carry out one or more commands. For example, the vehicle systems 112 may include a system that receives a voice input containing a command from the user 114 and transmits a control signal, data, or the like to other vehicle systems for executing the command. Other vehicle systems may include HVAC systems, infotainment systems, navigation systems, vehicle settings systems, and/or the like. Additional detail regarding the vehicle systems 112 will be described in greater detail herein with respect to FIGS. 3A-3C.

The user 114 is generally not limited by this disclosure, and may be any individual associated with the vehicle 110. For example, the user 114 may be a driver of the vehicle 110, a passenger of the vehicle 110, an owner of the vehicle 110, an authorized user of the vehicle 110, and/or the like. The user 114 may interact with the one or more vehicle systems 112, as indicated by the dashed line between the user 114 and the one or more vehicle systems 112 in FIG. 2. The user 114 may also communicate with a call center operator 124 associated with the call center 120, as indicated by the dashed line between the user 114 and the call center operator 124 in FIG. 2. Such communication may be completed via voice, such as over a telephone connection, a voice over data connection, and/or the like.

As previously described herein, the call center 120 may include a call center computing device 122. The call center computing device 122 may be configured to interface with the one or more vehicle systems 112, as indicated by the solid line in FIG. 2. Accordingly, data, signals, and/or the like may be transmitted between the one or more vehicle systems 112 and the call center computing device 122. For example, the call center computing device 122 may transmit a command to the one or more vehicle systems 112 for the purposes of carrying out a particular action, transmit computer programming data, and/or the like, as described in greater detail herein. In addition, the call center computing device 122 may be configured to interact with the call center operator 124, as shown by the dashed line between the call center computing device 122 and the call center operator 124 and previously described herein.

FIG. 3A schematically depicts illustrative hardware components of the vehicle 110 that may be used in determining user frustration from voiced inputs. While the components depicted in FIG. 3A are described with respect to the vehicle 110, it should be understood that similar components may also be used for the call center computing device 122 and/or the server computing device 130 (FIG. 1) without departing from the scope of the present disclosure.

The vehicle 110 may include the one or more vehicle systems 112 having a non-transitory computer-readable medium for completing the various processes described herein, embodied as hardware, software, and/or firmware, according to embodiments shown and described herein. While in some embodiments the vehicle system 112 may be configured as a general purpose computer with the requisite hardware, software, and/or firmware, in other embodiments, the vehicle system 112 may also be configured as a special purpose computer designed specifically for performing the functionality described herein. In embodiments where the vehicle system 112 is a general purpose computer, the methods described herein provide a means of improving the functionality of the vehicle system 112 by recognizing the user's frustration and alleviating such frustration by completing the various processes described herein such that the vehicle system 112 is more customized to a particular user's voice and commands. The vehicle system 112 may generally be an onboard vehicle computing system, such as, for example, a vehicle navigation system, a vehicle infotainment system, and/or the like. In some embodiments, the vehicle system 112 may be a plurality of vehicle computing systems.

As also illustrated in FIG. 3A, the vehicle system 112 may include a processing device 305, I/O hardware 310, network interface hardware 315, a data storage device 320, a non-transitory memory component 330, and user interface hardware 350. A local interface 300, such as a bus or the like, may interconnect the various components.

The processing device 305, such as a computer processing unit (CPU), may be the central processing unit of the vehicle system 112, performing calculations and logic operations to execute a program. The processing device 305, alone or in conjunction with the other components, is an illustrative processing device, computing device, processor, or combination thereof. The processing device 305 may include any processing component configured to receive and execute instructions (such as from the data storage device 320 and/or the memory component 330).

The memory component 330 may be configured as a volatile and/or a nonvolatile computer-readable medium and, as such, may include random access memory 340 (including SRAM, DRAM, and/or other types of random access memory), read only memory (ROM) 345, flash memory, registers, compact discs (CD), digital versatile discs (DVD), and/or other types of storage components. The memory component 330 may include one or more programming instructions thereon that, when executed by the processing device 305, cause the processing device 305 to complete various processes, such as the processes described herein with respect to FIG. 4. Still referring to FIG. 3A, the programming instructions stored on the memory component 330 may be embodied as a plurality of software logic modules, where each logic module provides programming instructions for completing one or more tasks, as described in greater detail hereinbelow with respect to FIG. 3B.

The network interface hardware 315 may include any wired or wireless networking hardware, such as a modem, LAN port, wireless fidelity (Wi-Fi) card, WiMax card, mobile communications hardware, and/or other hardware for communicating with other networks and/or devices.

The data storage device 320, which may generally be a storage medium, may contain one or more data repositories for storing data that is received and/or generated. The data storage device 320 may be any physical storage medium, including, but not limited to, a hard disk drive (HDD), memory, removable storage, and/or the like. While the data storage device 320 is depicted as a local device, it should be understood that the data storage device 320 may be a remote storage device, such as, for example, a server computing device or the like (e.g., the server computing device 130 of FIG. 1). Illustrative data that may be contained within the data storage device 320 is described hereinbelow with respect to FIG. 3C.

Still referring to FIG. 3A, the I/O hardware 310 may communicate information between the local interface 300 and one or more other components of the vehicle 110. For example, the I/O hardware 310 may act as an interface between the vehicle system 112 and other components, such as HVAC systems, navigation systems, mobile phone systems, infotainment systems, and/or the like. In some embodiments, the I/O hardware 310 may be utilized to transmit one or more commands to the other components of the vehicle 110.

The user interface hardware 350 may include various hardware components for communicating with a user, such as, for example, input hardware 352, display hardware 354, a microphone 356, and audio output hardware 358 (e.g., devices that allow for direct or indirect user interaction with the vehicle system 112). The input hardware 352 may include devices such as, for example, a keyboard, a mouse, a joystick, a camera, a touch screen, and/or another device for receiving non-voice inputs from a user. The display hardware 354 may include devices such as a video card, a monitor, and/or another device for sending and/or presenting visual data to a user. The microphone 356 may include any device that can receive sound (e.g., voice inputs) and generate computer signals and/or data from the received sound. The audio output hardware 358 may be a speaker or the like that generates and presents audible data to a user, such as spoken words, tones, and/or the like.

Figure 3B:
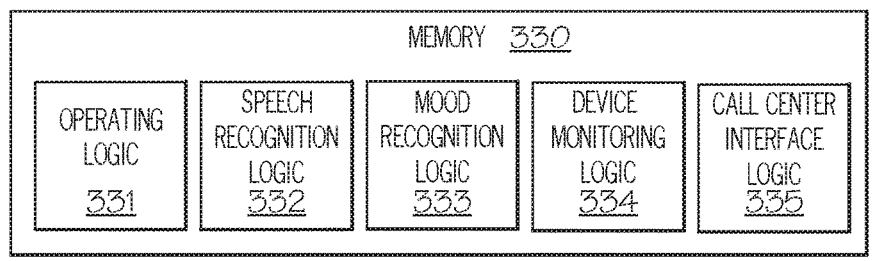
FIG. 3B schematically depicts an illustrative memory component containing illustrative logic components according to one or more embodiments shown and described herein.
Figure 4:
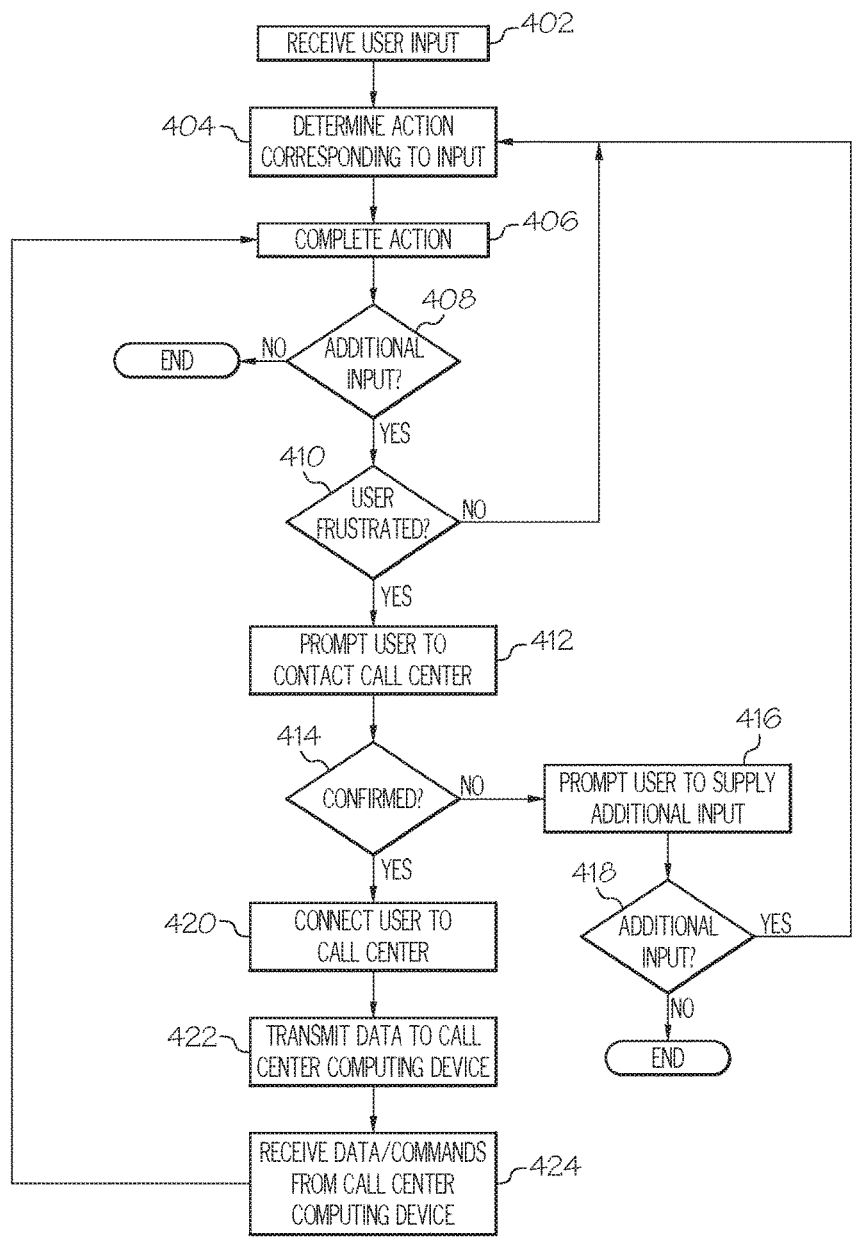
FIG. 4 depicts a flow diagram of an illustrative method of determining user frustration from voiced inputs according to one or more embodiments shown and described herein.

In some embodiments, the program instructions contained on the memory component 330 may be embodied as a plurality of software modules, where each module provides programming instructions for completing one or more tasks. For example, FIG. 3B schematically depicts the memory component 330 containing illustrative logic components according to one or more embodiments shown and described herein. As shown in FIG. 3B, the memory component 330 may be configured to store various processing logic, such as, for example, operating logic 331, speech recognition logic 332, mood recognition logic 333, device monitoring logic 334, and/or call center interface logic 335 (each of which may be embodied as a computer program, firmware, or hardware, as an example). The operating logic 331 may include an operating system and/or other software for managing components of the vehicle system 112 (FIG. 3A). The speech recognition logic 332 may contain one or more software modules for receiving audio signals, determining whether the audio signals correspond to speech, determining the speech, and generating machine readable signals or code that correspond to the speech, as described in greater detail herein. The mood recognition logic 333 may contain one or more software modules for analyzing the machine readable signals or code generated by the speech recognition logic 332 to determine whether the speech corresponds to a particular mood of the user, as described in greater detail herein. The device monitoring logic 334 may contain one or more software modules that monitor inputs and/or outputs from one or more other vehicle devices, so as to monitor the functioning of the one or more other vehicle devices, as described in greater detail herein. The call center interface logic 335 may contain one or more software modules for interfacing with the call center 120 and/or the call center computing device 122 (FIG. 1) to send and/or receive information to/from the call center 120 and/or the call center computing device 122, to allow the user 114 to communicate with the call center operator 124 (FIG. 2), and/or the like, as described in greater detail herein.

Figure 3C:
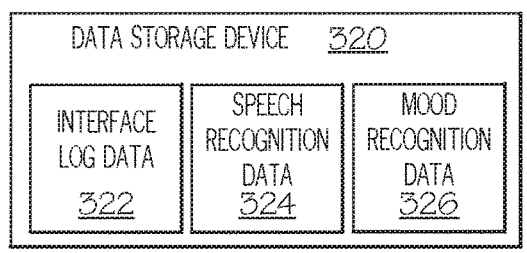
FIG. 3C schematically depicts an illustrative data storage device containing illustrative data components according to one or more embodiments shown and described herein.

FIG. 3C schematically depicts a block diagram of various data contained within a storage device (e.g., the data storage device 320) of a computing device and/or a vehicle component according to one or more embodiments shown and described herein. As shown in FIG. 3C, the data storage device 320 may include, for example, interface log data 322, speech recognition data 324, and/or mood recognition data 326. The interface log data 322 may include, for example, data relating to one or more processes completed by each user interface of the vehicle. The interface log data 322 may be usable by the call center computing device 122 and/or the call center operator 124 (FIG. 2) for the purposes of reviewing user inputs (including voice inputs) and determining the various vehicle system responses to the inputs so as to diagnose and correct issues, as described in greater detail herein. The speech recognition data 324 may generally be data that is generated and/or accessed by an automated speech recognition software program in determining one or more phonemes or the like from audio data, such as a voice input or the like and generating one or more electronic signals therefrom. The mood recognition data 326 may be data that is generated as a result of analysis of a user's speech, one or more user inputs, and/or one or more system responses to determine the mood of a user, such as whether the user is frustrated, as described in greater detail herein.

It should be understood that the components illustrated in FIGS. 3A-3C are merely illustrative and are not intended to limit the scope of this disclosure. More specifically, while the components in FIGS. 3A-3C are illustrated as residing within the vehicle system 112 of the vehicle 110, this is a nonlimiting example. In some embodiments, one or more of the components may reside external to the vehicle system 112 and/or the vehicle 110. Similarly, as previously described herein, while FIGS. 3A-3C are directed to the vehicle system 112 of the vehicle 110, other components such as the call center computing device 122 and the server computing device 130 (FIG. 1) may include similar hardware, software, and/or firmware.

As mentioned above, the various components described with respect to FIGS. 3A-3C may be used to carry out one or more processes and/or provide functionality for determining the correct pronunciation of dictated words in particular contexts. An illustrative example of the various processes is described with respect to FIG. 4.

While also referring to FIGS. 1-2 and 3A-3C, a user input may be received at block 402. The user input may generally be an audio input, such as a voice input from a user or the like. The input may be received via the microphone 356 and may be converted into computer-readable data that is supplied to the processing device 305 for completion of the remaining steps of FIG. 4.

The voice input that is received via the microphone 256 may generally include one or more spoken commands that are supplied by the user for the purposes of operating one or more vehicle systems via voice. For example, the user may use voice commands to change various vehicle settings, change a channel on a radio, a track on a music player, control components connected to the vehicle (e.g., the user's personal phone), adjust a temperature, input an address to a navigation system, adjust a cabin temperature or other climate control settings, and/or the like. It should be understood that the user input may be a voice input that corresponds to an interaction between the user and the vehicle's voice recognition system.

The user input may be parsed, and at block 404, the vehicle's automated speech recognition system may determine an action from the user input. That is, the processing device 305 may analyze the user input received from the microphone 356 to determine one or more words. Such a determination may be made, for example, by extracting phonemes or the like from the input and comparing individual phonemes or combinations of phonemes with one or more reference words in a reference table to determine the words therefrom. It should be understood that the parsing for the purposes of determining an input at block 404 may be completed using any voice recognition technology that is now known or later developed to recognize speech from an audio input.

Once the action has been determined, the action may be completed at block 406. That is, the processing device 305 may execute a command and/or transmit a signal to one or more other vehicle components for execution. For example, if the determination is that the user has provided a voice input corresponding to an increased volume command (e.g., the voice recognition technology determines that the user said "turn up the volume" or "set the volume to 11"), the processing device 305 may increase the volume on the infotainment system or direct the infotainment system to increase the volume by transmitting a signal to the infotainment system to act accordingly.

At block 408, the processing device 305 may determine if an additional input has been received. Such a determination may be made, for example, by monitoring for additional audio inputs received via the microphone 356 and/or additional inputs received by the input hardware 352. If no additional input has been received, an assumption may be made that the completed action corresponded to the user input, and thus the user is (or should be) satisfied (i.e., not frustrated). Accordingly, the process may end. However, if an additional input has been received, the process may proceed to block 410.

At block 410, a determination may be made as to whether the user is frustrated. Such a determination may be made by the processing device 305 by analyzing the additional input and/or supplemental information and looking for indicators that correspond to the user's mood, particularly the user's frustration. Such indicators are not limited by this disclosure and may be any indicators. For example, the indicators may be the user's voice tone. That is, if the processing device 305 recognizes negative words, a change in pitch in the user's voice, the speed in which the user speaks, and/or the like, the processing device 305 may determine that the user's voice tone has changed and may determine if such a change is an indicator of frustration. In another example, the indicators may be the use of particular words that are indicative of frustration, such as swear words, the word "frustrate", and/or the like. In another example, other sounds emitted by the user may be indicative of frustration, such as grumbling, muttering, sighing, and/or the like. In yet another example, the indicators may be the volume of the user's voice. That is, if the processing device 305 detects a change in volume of the user's voice (e.g., the volume is louder because the user is shouting), such a change may be an indicator of frustration. It should be understood that the indicators provided herein are merely illustrative, and any other indicator may also be used. It should further be understood that such a determination in block 410 may be completed by any commercially available voice learning software that is capable of determining various voice characteristics from inputted speech, including frustration.

In some embodiments, frustration may also be determined from non-voice inputs or other information received by the processing device 305. For example, the type and/or characteristics of inputs received via the input hardware 352 may be analyzed for indicators of frustration. That is, certain inputs received via the input hardware 352, whether received alone or in conjunction with other information (e.g., the voice inputs), may be indicative of the user's frustration. As an example, if a user repeatedly attempts to hit the same button or repeatedly executes the same command a number of times in a short period (e.g., 10 times in a one minute period), such inputs may be indicative of frustration. As another example, user inputs indicating that the user is cycling through successive menu items without selecting a particular function may be indicative of frustration. As another example, frustration may be determined from the amount of pressure applied by the user on various vehicle components (e.g., gripping the steering wheel at an increased pressure relative to a baseline, non-frustrated grip, pushing buttons at an increased pressure relative to a baseline, non-frustrated pushing of buttons, and/or the like). As yet another example, user inputs that are received in conjunction with a voice input of the user muttering under his/her breath, grumbling, sighing, and/or the like might also be an indicator of frustration. It should be understood these examples are merely illustrative, and other inputs or related information may also provide indicators of the user's frustration without departing from the scope of the present disclosure.

In some embodiments, frustration may further be determined from biometric information received by the processing device 305. That is, the vehicle 110 may include one or more biometric sensors located in the vehicle 110 that sense biometric information regarding the user, compare the biometric information to baseline biometric values, and determine frustration if the sensed biometric information does not correspond to the baseline biometric values. For example, a user-facing camera may monitor the user's face for certain facial expressions, eye dilation, and/or the like that are indicative of frustration. In another example, heart rate sensors coupled to the steering wheel, shift knob, or the like may monitor a user's heart rate or other characteristics indicative of frustration.

If the determination is made at block 410 that the user is not frustrated (i.e., the inputs do not appear to indicate frustration), the process may return to block 404 for an additional determination of an action to be taken that corresponds to the received inputs. If the determination is made at block 410 that the user is frustrated, the process may proceed to block 412.

At block 412, the user may be prompted to contact the call center. That is, the processing device 305 may direct the display hardware 354 and/or the audio output hardware 358 to provide a query to the user. For example, the display hardware 354 may display the text "WOULD YOU LIKE TO CONTACT A CONCIERGE REPRESENTATIVE TO ASSIST YOU" in conjunction with "YES" and "NO" buttons for the user to select or by providing the user with an ability to voice an affirmative or a negative response. In another example, the audio output hardware 358 may emit a tone and/or a voice asking if the user would like to be connected to the call center, for which the user may select "YES" or "NO" buttons via the input hardware 352 and/or may voice a "yes" or "no" response. At block 414, a determination may be made as to whether the user confirmed or declined to be connected to the call center. If the user declined to be connected (e.g., by selecting a "NO" button or voicing a negative response), the process may proceed to block 416. If the user confirmed a connection (e.g., by selecting a "YES" button or by voicing an affirmative response), the process may proceed to block 420. It should be understood that the processes described with respect to blocks 412 and 414 are optional. That is, the process may not prompt a user, but rather may automatically connect the user to a call center when frustration is detected.

At block 416, the user may be prompted to supply an additional input. That is, the user may receive a message via the display hardware 354 and/or the audio output hardware 358 that the input was not understood, and the user should supply the command again, supply a different command, or the like to proceed. At block 418, a determination may be made as to whether the user supplied an additional input. If so, the process may return to block 404 as described herein. If not, the process may end.

At block 420, the user 114 may be connected to the call center. That is, a voice connection between the user 114 and the call center operator 124 may be initiated, either as a voice call via telephone or as a voice over data connection. In addition to connecting the user 114 to the call center operator 124, the vehicle 110 and/or the one or more vehicle systems 112 thereof may be coupled to the call center computing device 122 as part of the process completed at block 420.

At block 422, data may be transmitted from the vehicle 110 and/or the one or more vehicle systems 112 thereof to the call center computing device 122. Such data is not limited by this disclosure and may generally be any data that may assist the call center operator 124 in alleviating the frustration of the user 114. Illustrative examples of the data that may be transmitted according to block 422 may include, but are not limited to, vehicle system settings, a log of the user interaction that resulted in the frustration, previous user interaction with the various vehicle systems, subscription information, previous connections with the call center 120, vehicle make, model, and year information, and/or the like.

The call center operator 124 may determine from the transmitted information and/or personal interaction what the issue is for the user 114 (i.e., why the user 114 is frustrated) and may further determine how to alleviate the frustration and/or solve the problems. The call center operator 124 may also provide instructions to the user 114 for alleviation and/or may cause the call center computing device 122 to transmit instructions to the vehicle 110 and/or the one or more vehicle systems 112 to provide inputs, enter data, and/or the like. Accordingly, the vehicle 110 and/or the one or more vehicle systems 112 thereof may receive data from the call center computing device at block 424.

In some embodiments, the call center operator 124 may escalate the issue for future remedying. For example, the call center operator 124 may transmit information to a software development team for the purposes of generating new code that can be pushed to the vehicle 110 and/or the one or more vehicle systems 112 thereof to avoid the same issue or a similar issue for occurring in the future. In some embodiments, the call center operator 124 may also direct the user through a series of voice commands and/or physical inputs to train the vehicle 110 and/or a system thereof to recognize certain voice inputs of the user. For example, the call center operator 124 may direct the user to train the vehicle 110 and/or a system thereof to recognize the user's accent, the user's dialect, and/or the like.

The process may then return to block 406 for completion of one or more actions, as described in greater detail herein. In addition, the connection between the call center 120 and the vehicle 110 (including between the user 114 and the call center operator 124) may end.

It should now be understood that the systems, methods, and vehicle components described herein may function to monitor a user's interactions with one or more vehicle systems for the purposes of determining whether a user is frustrated. If the user is frustrated, the systems, methods, and vehicle components described herein may further be configured to connect the user and/or the vehicle components to a call center for the purposes of determining the reason for the frustration and remedying the issue for the user so as to avoid having the user become even more frustrated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining user frustration, the method comprising:
   receiving, by a microphone communicatively coupled to a processing device, a voice input from a user, wherein:
      the voice input corresponds to an interaction between the user and a voice recognition system, and
      the voice input comprises one or more indicators of the user frustration;
   determining, by the processing device, that the user is frustrated from the one or more indicators;
   connecting, by the processing device, the user to a call center operator;
   transmitting, by the processing device, data to a call center computing device associated with the call center operator, the data corresponding to one or more user inputs, one or more vehicle responses that resulted in the user frustration, and one or more vehicle system settings;
   receiving, by the processing device, one or more commands from the call center computing device; and
   executing, by the processing device, one or more processes that correspond to the one or more commands.

2. The method of claim 1, further comprising receiving, by the processing device, supplemental information corresponding to the one or more indicators of the user frustration.

3. The method of claim 2, wherein receiving the supplemental information comprises one or more of:
   receiving one or more inputs supplied via input hardware; and
   receiving biometric information regarding the user.

4. The method of claim 3, wherein receiving the one or more inputs comprise receiving one or more of the following: a repeated activation of the same command, a cycling of menu items without selection of a function, and an increased grip on a component relative to a baseline grip.

5. The method of claim 1, wherein the one or more indicators comprise one or more of the following: a voice tone, a keyword indicative of frustration, or a volume of the user's voice.

6. The method of claim 1, further comprising, prior to receiving the voice input:
   receiving, by the processing device, a first user input corresponding to a first user command;
   determining, by the processing device, an action that corresponds to the first user command; and
   completing, by the processing device, the action,
   wherein the action does not correspond to an intended action by the user.

7. The method of claim 1, wherein receiving the voice input comprises monitoring one or more voice interactions between the user and the voice recognition system.

8. The method of claim 1, further comprising, prior to connecting the user to the call center operator:
   prompting, by the processing device, the user to contact the call center operator; and
   receiving, by the processing device, confirmation from the user in response to the prompting.

9. A system for determining user frustration, the system comprising:
   a microphone;
   a processing device communicatively coupled to the microphone; and
   a non-transitory, processor-readable storage medium, the non-transitory, processor-readable storage medium comprising one or more programming instructions thereon that, when executed, cause the processing device to:
      receive, from the microphone, data pertaining to a voice input from a user, wherein:
         the voice input corresponds to an interaction between the user and a voice recognition system, and
         the voice input comprises one or more indicators of the user frustration;
      determine that the user is frustrated from the one or more indicators,
      connect the user to a call center operator,
      transmit data to a call center computing device associated with the call center operator, the data corresponding to one or more user inputs one or more vehicle responses that resulted in the user frustration, and one or more vehicle system settings,
      receive one or more commands from the call center computing device, and
      execute one or more processes that correspond to the one or more commands.

10. The system of claim 9, wherein the system is located in a vehicle.

11. The system of claim 9, wherein the non-transitory, processor-readable storage medium further comprises one or more programming instructions that, when executed, cause the processing device to receive supplemental information corresponding the one or more indicators of the user frustration.

12. The system of claim 11, wherein the one or more programming instructions that, when executed, cause the processing device to receive the supplemental information further cause the processing device to receive one or more of:
   an input supplied via input hardware; and
   biometric information regarding the user.

13. The system of claim 12, wherein the one or more inputs comprise one or more of the following: a repeated activation of the same command, a cycling of menu items without selection of a function, and an increased grip on a component relative to a baseline grip.

14. The system of claim 9, wherein the one or more indicators comprise one or more of the following: a voice tone, a keyword indicative of frustration, or a volume of the user's voice.

15. The system of claim 9, wherein the non-transitory, processor-readable storage medium further comprises one or more programming instructions that, when executed, cause the processing device to:
receive a first user input corresponding to a first user command,
determine an action that corresponds to the first user command, and
complete the action,
wherein the action does not correspond to an intended action by the user.

16. The system of claim 9, wherein the one or more programming instructions that, when executed, cause the processing device to receive the voice input further cause the processing device to monitor one or more voice interactions between the user and the voice recognition system.

17. The system of claim 9, wherein the non-transitory, processor-readable storage medium further comprises one or more programming instructions that, when executed, cause the processing device to:
prompt the user to contact the call center operator; and
receive confirmation from the user in response to the prompt.

18. A vehicle component for determining user frustration, the vehicle component comprising:
a microphone configured to receive a voice input from a user, wherein:
the voice input corresponds to an interaction between the user and a voice recognition system, and
the voice input comprises one or more indicators of the user frustration; and
a processing device communicatively coupled to the microphone and configured to:
determine that the user is frustrated from the one or more indicators,
connect the user to a call center operator,
transmit data to a call center computing device associated with the call center operator, the data corresponding to one or more user inputs, one or more vehicle responses that resulted in the user frustration, and one or more vehicle system settings,
receive one or more commands from the call center computing device, and
execute one or more processes that correspond to the one or more commands.

19. The vehicle component of claim 18, wherein the processing device is further configured to receive supplemental information corresponding to the one or more indicators of the user frustration.

20. The vehicle component of claim 18, further comprising user interface hardware configured to:
prompt the user to contact the call center operator; and
receive confirmation from the user in response to the prompt.

* * * * *

UNITED STATES PATENT AND TRADEMARK OFFICE
CERTIFICATE OF CORRECTION

PATENT NO. : 10,381,005 B2
APPLICATION NO. : 15/824627
DATED : August 13, 2019
INVENTOR(S) : Scott A. Friedman et al.

Page 1 of 1

It is certified that error appears in the above-identified patent and that said Letters Patent is hereby corrected as shown below:

On the Title Page

At Column 2, Line 13, item (56), references cited, U.S. patent documents, cite no. 3, delete "Ering et al." and insert --Hering et al.--, therefor.

Signed and Sealed this
Eighth Day of October, 2019

Andrei Iancu
*Director of the United States Patent and Trademark Office*